United States Patent
Kasztelan et al.

(10) Patent No.: US 6,171,474 B1
(45) Date of Patent: Jan. 9, 2001

(54) ZEOLITE Y CATALYST CONTAINING SILICON USEFUL FOR HYDROCRACKING

(75) Inventors: Slavik Kasztelan, Rueil Malmaison; Nathalie George-Marchal, Saint Genis Laval; Eric Benazzi, Chatou, all of (FR)

(73) Assignee: Institut Francais du Petrole, Rueil Malmaison Cedex (FR)

(*) Notice: Under 35 U.S.C. 154(b), the term of this patent shall be extended for 0 days.

(21) Appl. No.: 09/305,288

(22) Filed: May 5, 1999

(30) Foreign Application Priority Data

May 6, 1998 (FR) .................................................. 98 05734

(51) Int. Cl.$^7$ .................................................. C01G 47/00
(52) U.S. Cl. .................................. 208/111.01; 208/111.2; 208/111.3; 208/111.35; 202/63; 202/64; 202/66; 202/74; 202/79
(58) Field of Search .................................. 502/64, 65, 66, 502/74, 75, 79, 84, 63; 585/260; 208/135, 111.01, 111.35, 111.3, 111.2

(56) References Cited

U.S. PATENT DOCUMENTS

| | | | |
|---|---|---|---|
| 3,620,964 | * 11/1971 | Stover et al. | 208/111 |
| 4,080,284 | 3/1978 | Mitchell | 208/111 |
| 4,379,761 | * 4/1983 | Olson et al. | 252/435 |
| 4,477,583 | * 10/1984 | Rodewald | 502/71 |
| 4,585,748 | 4/1986 | Usui et al. | 502/66 |
| 4,738,941 | * 4/1988 | Dufresne et al. | 502/66 |
| 4,894,142 | 1/1990 | Steigleder | 208/111 |
| 4,906,559 | 3/1990 | Nishijima et al. | 430/551 |
| 5,080,778 | * 1/1992 | Lambert | 208/111 |
| 5,139,648 | * 8/1992 | Lambert | 208/111 |
| 5,179,054 | * 1/1993 | Schipper et al. | 502/67 |
| 5,198,097 | * 3/1993 | Bogdan et al. | 208/79 |
| 5,200,059 | * 4/1993 | Bogdan et al. | 208/79 |
| 5,286,692 | * 2/1994 | Zhao et al. | 502/65 |
| 5,306,860 | * 4/1994 | Bigeard et al. | 585/737 |
| 5,345,019 | * 9/1994 | Bigeard et al. | 585/264 |
| 5,525,209 | 6/1996 | Billon et al. | 208/59 |

FOREIGN PATENT DOCUMENTS

| | | |
|---|---|---|
| 0 372 632 | 6/1990 | (EP) . |
| 2 758 278 | 7/1998 | (FR) . |
| 2 063 700 | 6/1981 | (GB) . |

* cited by examiner

Primary Examiner—Tom Dunn
(74) Attorney, Agent, or Firm—Millen, White, Zrlano & Branigan, P.C.

(57) ABSTRACT

Useful for example, for the hydrocracking of hydrocarbons is a catalyst comprising a matrix, at least one Y zeolite which is dealuminated and has a lattice parameter in the range 2.424 nm to 2.455 nm, a global $SiO_2/Al_2O_3$ mole ratio is more than 8, the quantity of alkaline-earth metal cations or alkali metal cations and/or rare earth metal cations is such that the atomic ratio $(n \times M^{n+})/Al$ is less than 0.8, the specific surface area, determined using the BET method, is more than 400 m$^2$/g, and the water adsorption capacity is more than 6% by weight for $P/P_0 = 0.2$ at 25° C., said catalyst also comprising silicon deposited on the catalyst.

24 Claims, No Drawings

ZEOLITE Y CATALYST CONTAINING SILICON USEFUL FOR HYDROCRACKING

FIELD OF THE INVENTION

The present invention relates to a catalyst comprising a matrix, at least one particular Y zeolite, at least one hydro-dehydrogenating metal, and silicon deposited on the catalyst.

The present invention also relates to processes for preparing said catalyst, and to its use in converting hydrocarbon-containing feeds such as petroleum cuts, cuts from coal, or hydrocarbons produced from natural gas. The hydrocarbon-containing feeds contain aromatic and/or olefinic and/or naphthenic and/or paraffinic compounds, and possibly metals and/or nitrogen and/or oxygen and/or sulphur.

BACKGROUND OF THE INVENTION

Hydrocracking is gaining in importance in refining as the need to convert heavy fractions into lighter fractions which can be upgraded as fuels increases. This results from the increasing demand for fuels. Such upgrading involves a relatively large reduction in the molecular weight of the heavy constituents which can, for example, be achieved through cracking reactions.

The catalytic hydrocracking process uses catalysts containing a hydrogenating, desulphurising and denitrogenating function provided by the active phase based on transition metals, and an acidic function, generally provided by the amorphous matrix or a zeolite, or a mixture thereof. A good hydrocracking catalyst will be constituted by a properly adjusted hydrogenating function and acidic function. Hydrocracking is used to treat feeds such as vacuum gas oils, and atmospheric or vacuum residues, which may or may not be deasphalted. Hydrocracking can produce highly purified lighter cuts, i.e., with a low sulphur, nitrogen and metals content.

Increasing the activity and selectivity of hydrocracking catalysts is thus important. One means consists of acidifying the matrix without poisoning the activity of either the transition-metal based hydrogenating phase or the cracking activity of the zeolite-based acidic phase.

SUMMARY OF THE INVENTION

The invention relates to a catalyst suitable for use in hydrocracking hydrocarbon-containing feeds. The catalyst contains at least one hydro-dehydrogenating metal, preferably selected from group VIB and group VIII of the periodic table. The catalyst comprises at least one Y zeolite with a faujasite structure which is at least partially in its hydrogen form, and an amorphous or low crystallinity matrix acting as a binder. The catalyst is characterized in that it also comprises silicon as a promoter element, and optionally phosphorous and/or boron, optionally a group VIIA element (halogen), preferably fluorine, and optionally a group VIIB element (preferably manganese, and rhenium may also be advantageous).

The catalyst of the invention has a higher hydrocracking activity and selectivity than those of prior art catalytic formulae based on dealuminated Y zeolite. Without wishing to be bound to a particular theory, it appears that this particularly high activity of the catalysts of the present invention is due to the acidity of the catalyst being reinforced by the joint presence of boron and silicon on the matrix which causes a very substantial improvement in the hydrocracking properties compared with catalysts in routine use.

The catalyst of the present invention generally comprises, in weight % with respect to the total catalyst weight, at least one metal selected from the following groups and with the following amounts:

- 0.1% to 60%, preferably 0.1% to 50%, more preferably 0.1% to 40%, of at least one hydro-dehydrogenating metal selected from group VIB and group VIII (% of oxide);
- 0.1% to 99.7%, preferably 1% to 99%, of at least one amorphous or low crystallinity oxide type porous mineral matrix;
- 0.1% to 90%, preferably 0.1% to 80%, more preferably 0.1% to 70%, of at least one Y zeolite with a lattice parameter in the range 2.424 to 2.455 nm, preferably in the range 2.426 to 2.438 nm and which shows particular characteristics hereafter described;
- 0.1% to 20%, preferably 0.1% to 15%, more preferably 0.1% to 10%, of silicon deposited on the support (matrix + zeolite) and principally located on the matrix (% of oxide);

and optionally:
- 0 to 20%, preferably 0.1% to 15%, more preferably 0.1% to 10%, of boron, advantageously deposited on the catalyst;
- 0 to 20%, preferably 0.1% to 15%, more preferably 0.1% to 10%, of phosphorous (% of oxide), advantageously deposited on the catalyst;
- 0 to 20%, preferably 0.1% to 15%, more preferably 0.1% to 10%, of at least one element selected from group VIIA, preferably fluorine;
- 0 to 20%, preferably 0.1% to 15%, more preferably 0.1% to 10%, of at least one element selected from group VIIB (% of oxide).

The used dealuminated Y zeolite is characterized by different specifications:
- a lattice parameter in the range 2.424 to 2.455 nm, preferably in the range 2.426 to 2.438 nm;
- a global $SiO_2/Al_2O_3$ mole ratio of more than 8;
- a framework $SiO_2/Al_2O_3$ mole ratio which is higher than or equal to the global $SiO_2/Al_{2O3}$ mole ratio;
- a quantity of cations of alkaline-earth metals or alkali metals and/or rare earth cations (atomic number 57 to 71 inclusive) such that the atomic ratio $[n \times M^{n+}]/Al$ (n being the charge of cation M) is less than 0.8, preferably less than 0.5 and more preferably less than 0.1;
- a specific surface area, determined by the BET method, of more than about 400 $m^2/g$, preferably more than 550 $m^2/g$;
- a water adsorption capacity for $P/P_0$ _0.2 of more than about 6% by weight at 25° C.

The group VIB, group VIII and group VIIB metals in the catalyst of the present invention can be completely or partially present in the form of the metal and/or oxide and/or sulphide.

The catalysts of the invention can be prepared using any suitable method. Preferably, the silicon and/or boron are introduced into the catalyst already containing the support and the group VIB and optional group VIII metal or metals. Preferably, a conventional NiMo or NiMoP type hydrocracking catalyst on a support comprising a mixture of alumina and Y zeolite is impregnated with an aqueous boron solution or with an aqueous silicon solution or it is impregnated with an aqueous solution containing both boron and silicon.

The silicon introduced onto the support of the invention is principally located on the matrix of the support and can be characterized by techniques such as a Castaing microprobe (distribution profile of the various elements), transmission electron microscopy coupled with X ray analysis of the catalyst components, or by producing a distribution map of the elements present in the catalyst by electronic microprobe. These local analyses can furnish the location of the various elements, in particular that of the promoter element, more particularly that of the amorphous silica, on the support matrix due to introduction of the silicon in accordance with the invention. The location of the silicon on the framework of the zeolite contained in the support is also revealed. Further, a quantitative estimate of the local silicon contents or other promoter elements can be carried out.

In addition, $^{29}$Si NMR with magic angle spinning is a technique which can detect the presence of the amorphous silica introduced into the catalyst using the procedure described in the present invention.

More particularly, a process for preparing the catalyst of the present invention comprises the following steps:

a) preparing a mixture hereinafter termed the precursor, comprising at least the following compounds: a matrix (amorphous and/or low crystallinity), at least one Y zeolite (preferably dealuminated), at least one element (hydro-dehydrogenating, from group VIB and/or VIII), optionally phosphorous, the whole preferably being formed and dried;

b) impregnating the precursor defined in step a) with a solution (preferably aqueous) containing silicon, optionally phosphorous and/or boron, and optionally at least one group VIIA element, preferably fluorine;

c) advantageously, leaving the moist solid in a moist atmosphere at a temperature in the range 10° C. to 80° C.;

d) drying the moist solid obtained in step b) at a temperature in the range 60° C. to 150° C.;

e) calcining the solid obtained from step c) at a temperature in the range 150° C. to 800° C.

Step a) above can be carried out using conventional methods known to the skilled person.

One preferred method of the invention, when boron and silicon are to be introduced, consists of preparing an aqueous solution of at least one boron salt such as ammonium biborate or ammonium pentaborate in an alkaline medium and in the presence of hydrogen peroxide and introducing a silicone type silicon compound into the solution and then dry impregnating, wherein the pore volume in the precursor is filled with the solution containing B and Si. This method of depositing B and Si is better than the conventional method using an alcoholic solution of boric acid or a solution of ethyl orthosilicate in alcohol. When boron alone is to be introduced, an aqueous solution of at least one boron salt such as ammonium biborate or ammonium pentaborate is used in an alkaline medium and in the presence of hydrogen peroxide then dry impregnation is carried out as described above. When silicon alone is to be introduced, an aqueous solution of a silicone type silicon compound is used, and dry impregnation is carried out.

The Si and optional P and/or B and the optional element selected from group VIIA, the halogens, preferably F, can be introduced into the catalyst at various stages of the preparation and in various manners.

The matrix is preferably impregnated using the "dry" impregnation method which is well known to the skilled person. Impregnation can be carried out in a single step using a solution containing all of the constituent elements of the final catalyst.

The Si, optional P and/or B and the element selected from halide ions of group VIIA can be separately introduced into the calcined precursor using one or more impregnation operations with an excess of solution.

Thus, for example, in the preferred case where, for example, the precursor is a catalyst of the nickel-molybdenum type supported on alumina and dealuminated Y zeolite, it is possible to impregnate this precursor with an aqueous solution of ammonium biborate and/or Rhodorsil E1P from Rhone-Poulenc, to dry, for example at 80° C., then to impregnate with a solution of ammonium fluoride, to dry, for example at 80° C., and to calcine, for example and preferably in air in a traversed bed, for example at 500° C. for 4 hours.

Other impregnation sequences can be carried out to obtain the catalyst of the present invention.

It is thus possible to impregnate with the solution containing the silicon, to dry, calcine and impregnate with the solution containing boron, to dry and then carry out the final calcining step.

It is also possible to impregnate with the solution containing the boron, to dry, to calcine then impregnate with the solution containing the silicon, to dry and then carry out the final calcining step.

It is also possible to impregnate the precursor with a solution containing phosphorous, to dry then calcine, then impregnate the solid obtained with the solution containing the boron, to dry, calcine then impregnate with the solution containing the silicon, to dry and then carry out the final calcining step.

When the metals are introduced in a plurality of steps for impregnating the corresponding precursor salts, an intermediate catalyst drying step is generally carried out at a temperature generally in the range 60° C. to 250° C.

The preferred phosphorous source is orthophosphoric acid $H_3PO_4$, but its salts and esters such as ammonium phosphates are also suitable. Phosphorous can, for example, be introduced in the form of a mixture of phosphoric acid and a basic organic compound containing nitrogen, such as ammonia, primary and secondary amines, cyclic amines, pyridine group compounds, quinolines, and pyrrole group compounds.

A variety of silicon sources can be used. Examples are ethyl orthosilicate $Si(OEt)_4$, siloxanes, polysiloxanes, silicones, silicone emulsions and halogenated silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture. Silicon can be added, for example, by impregnation using an emulsion of a silicone suspended in water.

The boron source can be boric acid, preferably orthoboric acid $H_3BO_3$, ammonium biborate or pentaborate, boron oxide, or boric esters. Boron can, for example, be introduced in the form of a mixture of boric acid, hydrogen peroxide and a basic organic compound containing nitrogen, such as ammonia, primary and secondary amines, cyclic amines, pyridine group compounds, quinolines, and pyrrole group compounds. Boron can, for example, be introduced using a solution of boric acid in a water/alcohol mixture.

Sources of group VIIA elements which can be used are well known to the skilled person. As an example, fluoride anions can be introduced in the form of hydrofluoric acid or its salts. Such salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, silicon tetrafluoride $SiF_4$ or sodium fluorosilicate $Na_2SiF_6$. Fluorine can be introduced, for example, by impregnating an aqueous hydrofluoride solution or ammonium fluoride.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts. Preferably, oxides and ammonium salts are used, such as ammonium molybdate, ammonium heptamolybdate and ammonium tungstate.

The catalyst of the present invention can comprise a group VIII metal such as iron, cobalt or nickel. Advantageously, the following combinations of metals are used: nickel-molybdenum, cobalt-molybdenum, iron-molybdenum, iron-tungsten, nickel-tungsten, cobalt-tungsten. Preferred combinations are: nickel- molybdenum and nickel-tungsten. It is also possible to use combinations of three metals, for example nickel-cobalt-molybdenum.

The sources of the group VIII elements which can be used are well known to the skilled person. Examples are nitrates, sulphates, phosphates, halides, for example chlorides, bromides and fluorides, and carboxylates, for example acetates and carbonates.

Sources of the group VIIB element which can be used are well known to the skilled person. Preferably, ammonium salts, nitrates and chlorides are used.

The catalyst of the present invention thus also comprises at least one amorphous or low crystallinity porous mineral matrix, generally an oxide. Non limiting examples are aluminas, silicas, and silica-aluminas. Aluminates can also be used. Preferably, matrices containing alumina in any of its forms which are known to the skilled person, preferably gamma alumina, are used.

Advantageously, mixtures of alumina and silica, mixtures of alumina and silica-alumina and mixtures of alumina and boron oxide can also be used.

Mixtures of alumina and Y zeolite and mixtures of silica-alumina and Y zeolite can also advantageously be used.

Molybdenum impregnation can be facilitated by adding phosphoric acid to ammonium paramolybdate solutions, which enables phosphorous to be introduced as well, to promote the catalytic activity. Other phosphorous compounds can be used, as is well known to the skilled person.

The catalysts of the present invention are formed into grains of different shapes and dimensions. They are generally used in the form of cylindrical or polylobed extrudates such as bilobes, trilobes, or polylobes with a straight or twisted shape, but they can also be produced and used in the form of compressed powder, tablets, rings, beads or wheels. The specific surface area is measured by nitrogen adsorption using the BET method (Brunauer, Emmett, Teller, J. Am. Chem. Soc., vol. 60, 309–316 (1938)) and is in the range 50 to 600 $m^2/g$, the pore volume measured using a mercury porisimeter is in the range 0.2 to 1.5 $cm^3/g$ and the pore size distribution may be unimodal, bimodal or polymodal.

The catalysts of the invention can be used for hydrocarbon conversion.

In particular, the catalysts of the present invention are used for hydrocracking hydrocarbon-containing feeds such as petroleum cuts. The feeds used in the process are gasolines, kerosines, gas oils, vacuum gas oils, atmospheric residues, vacuum residues, atmospheric distillates, vacuum distillates, heavy fuels, oils, waxes and paraffins, spent oil, deasphalted residues or crudes, feeds from thermal cracking (without hydrogen) or fluidised bed catalytic cracking processes (FCC), and their mixtures. They contain heteroatoms such as sulphur, oxygen and nitrogen and possibly metals.

The catalysts obtained are advantageously used for hydrocracking, in particular of vacuum distillate type heavy hydrocarbons, deasphalted residues or hydrotreated residues or the like. The heavy cuts are preferably constituted by at least 80% by volume of compounds with a boiling point of at least 350° C., preferably in the range 350° C. to 580° C. They generally contain heteroatoms such as sulphur and nitrogen. The nitrogen content is usually in the range 1 to 5000 ppm by weight and the sulphur content is in the range 0.01% to 5% by weight.

The hydrocracking conditions such as temperature, pressure, hydrogen recycle ratio, and hourly space velocity, can vary widely depending on the nature of the feed, the quality of the desired products and the facilities available to the refiner. The temperature is generally over 200° C. and usually in the range 250° C. to 480° C. The pressure is over 0.1 MPa and usually over 1 MPa. The hydrogen recycle ratio is a minimum of 50 and usually in the range 80 to 5000 normal litres of hydrogen per litre of feed. The hourly space velocity is generally in the range 0.1 to 20 volumes of feed per volume of catalyst per hour.

The catalysts of the present invention preferably undergo sulphurisation to transform at least part of the metallic species to the sulphide before bringing them into contact with the feed to be treated. This activation treatment by sulphurisation is well known to the skilled person and can be carried out using any method already described in the literature.

One conventional sulphurisation method which is well known to the skilled person consists of heating in the presence of hydrogen sulphide to a temperature in the range 150° C. to 800° C., preferably in the range 250° C to 600° C, generally in a traversed bed reaction zone.

The catalyst of the present invention can advantageously be used for hydrocracking vacuum distillate type cuts containing large quantities of sulphur and nitrogen.

In a first implementation, or partial hydrocracking, also known as mild hydrocracking, the degree of conversion is below 55%. The catalyst of the invention is thus used at a temperature which is generally 230° C. or more, preferably 300° C., generally at most 480° C., and usually in the range 350° C. to 450° C. The pressure is generally over 2 MPa and preferably 3 MPa, less than 12 MPa and preferably less than 10 MPa. The quantity of hydrogen is a minimum of 100 normal litres of hydrogen per litre of feed and usually in the range 200 to 3000 normal litres of hydrogen per litre of feed. The hourly space velocity is generally in the range 0.1 to 10 $h^{-1}$. Under these conditions, the catalysts of the present invention have better activities for conversion, hydrodesulphuration and hydrodenitrogenation than commercially available catalysts.

In a second implementation, the catalyst of the present invention can be used for partial hydrocracking, advantageously under moderate hydrogen pressure conditions, of cuts such as vacuum distillates containing high sulphur and nitrogen contents which have already been hydrotreated. In this hydrocracking mode, the degree of conversion is below 55%. In this case, the petroleum cut is converted in two steps, the catalysts of the invention being used in the second step. The catalyst of the first step has a hydrotreatment function and comprises a matrix, preferably alumina-based, preferably containing no zeolite, and at least one metal with a hydrogenating function. Said matrix is an amorphous or low crystallinity oxide type porous mineral matrix. Non limiting examples are aluminas, silicas, silica-aluminas. Aluminaates, magnesia, zirconia and titanium oxide can also be used. Preferably, matrices containing alumina are used, in any of the forms known to the skilled person, preferably aluminas, for example gamma alumina. The hydrotreatment function is ensured by at least one metal or compound of a metal from group VIII, such as nickel or cobalt. A combination of at least one metal or compound of a metal from group VIB of the periodic table (in particular molybdenum or tungsten) and at least one metal or compound of a metal from group VIII (in particular cobalt or nickel) can be used. The total concentration of groups VIB and VIII metal oxides is preferably in the range 5% to 40% by weight, most preferably in the range 7% to 30% by weight, and the weight ratio, expressed as the metal oxide of the group VIB metal (or metals) to that of the group VIII metal (or metals) is in the range 1.25 to 20, preferably in the range 2 to 10. Further, this catalyst can contain phosphorous. The phosphorous content, expressed as the concentration of phosphorous pentoxide $P_2O_5$, is generally at most 15%, preferably in the range 0.1% to 15% by weight, and more preferably in the range 0.15% to 10% by weight. It can also contain boron in a ratio B/P=1.05 to 2 (atomic), the sum of the B and P contents, expressed as the oxides, being 5% to 15% by weight.

The first step is generally carried out at a temperature of 350–460° C., preferably 360–450° C.; the pressure is at least 2 MPa, preferably at least 3 MPa; and the hourly space velocity is 0.1–5 $h^{-1}$, preferably 0.2–2 $h^{-1}$, with a quantity of hydrogen at least 100 Nl/Nl of feed, preferably 260–3000 Nl/Nl of feed.

In the conversion step using the catalyst of the invention (or second step), the temperatures are generally 230° C. or more and usually in the range 300° C. to 430° C. The pressure is generally at least 2 MPa, preferably at least 3 MPa; it is less than 12 MPa and preferably less than 10 MPa. The quantity of hydrogen is a minimum of 100 l/l of feed and usually in the range 200 to 3000 l/l of feed. The hourly space velocity is generally in the range 0.15 to 10 $h^{-1}$. Under these conditions, the catalysts of the present invention have better activities for conversion, hydrodesulphuration, and hydrodenitrogenation and a better selectivity for middle distillates than commercially available catalysts. The service life of the catalysts is also improved in the moderate pressure range.

In a further implementation, the catalyst of the present invention can be used for hydrocracking under high hydrogen pressure conditions of at least 5 MPa, preferably at least 10 MPa, and advantageously at least 12 MPa. The treated cuts are, for example, vacuum distillates containing high sulphur and nitrogen contents which have already been hydrotreated. In this hydrocracking mode, the degree of conversion is over 55%. In this case, the petroleum cut conversion process is carried out in two steps, the catalyst of the invention being used in the second step.

The catalyst for the first step is identical to that described above and used under the described conditions, the pressure being adjusted to that of this other implementation.

For the conversion step using the catalyst of the invention (or second step), the temperatures are generally 230° C. or more, usually in the range 300° C. to 430° C. The quantity of hydrogen is a minimum of 100 l/l of feed, usually in the range 200 to 3000 l/l of hydrogen per litre of feed. The hourly space velocity is generally in the range 0.15 to 10 $h^{-1}$.

Under these conditions, the catalysts of the present invention have better activities for conversion and better selectivity than commercially available catalysts, even with considerably lower zeolite contents than those of commercially available catalysts.

The following examples illustrate the present invention without in any way limiting its scope.

EXAMPLE 1

Preparation of a support containing a Y zeolite (in accordance with the invention)

Large quantities of a hydrocracking catalyst support containing a Y zeolite were produced so as to enable different catalysts based on the same support to be prepared. To this end, 20.5% by weight of a dealuminated Y zeolite with a lattice parameter of 2.429 nm, a global $SiO_2/Al_2O_3$ ratio of 30.4 and a framework $SiO_2/Al_2O_3$ ratio of 58 [calculated in accordance with the Fichtner-Schmittler correlation (in Cryst. Res. Tech. 1984, 19, K1)] was used, which was mixed with 79.5% by weight of a matrix composed of ultrafine tabular boehmite or alumina gel sold by Condéa Chemie GmbH under the trade name SB3. This powder mixture was then mixed with an aqueous solution containing 66% nitric acid (7% by weight of acid per gram of dry gel) then mixed for 15 minutes. After mixing, the paste obtained was passed through a die with cylindrical orifices with a diameter of 1.4 mm. The extrudates were dried overnight at 120° C. then calcined at 550° C. for 2 hours in moist air containing 7.5% by volume of water. Cylindrical extrudates 1.2 mm in diameter were obtained with a specific surface area of 223 $m^2/g$ and a unimodal pore size distribution centred on 10 nm. An X ray diffraction analysis of the matrix revealed that it was composed of low crystallinity cubic gamma alumina and dealuminated Y zeolite.

EXAMPLE 2

Preparation of catalysts containing a Y zeolite

Extrudates of the support containing a dealuminated Y zeolite of Example 1 were dry impregnated with an aqueous solution of a mixture of ammonium heptamolybdate and nickel nitrate, dried overnight at 120° C. in air and finally calcined at 550° C. in air. The oxide weight contents of catalyst CZ2 obtained are shown in Table 1. The final CZ2 catalyst contained 17.1% by weight of Y zeolite with a lattice paramter of 2.429 nm, a global $SiO_2/Al_2O_3$ ratio of 30.4 and a framework $SiO_2/Al_2O_3$ ratio of 58.

Catalyst CZ2 was then impregnated with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ2B was obtained. In the same way, catalyst CZ2Si was prepared by impregnating catalyst CZ2 with a Rhodorsil EP1 (Rhone-Poulenc) silicone emulsion. The impregnated extrudates were dried overnight at 120° C. then calcined at 550° C. for 2 hours in dry air. Finally, catalyst CZ2BSi was prepared by impregnating catalyst CZ2 with an aqueous solution comprising ammonium biborate and Rhodorsil EP1 (Rhone-Poulenc) silicone emulsion. The impregnated extrudates were dried overnight at 120° C. then calcined at 550° C. for 2 hours in dry air.

Extrudates of the support containing the dealuminated Y zeolite of Example 1 were also dry impregnated with an aqueous solution of a mixture of ammonium heptamolybdate, nickel nitrate and orthophosphoric acid, dried overnight at 120° C. in air and finally calcined at 550° C. in air. The oxide weight contents of catalyst CZ2P obtained are shown in Table 1. The final CZ2P catalyst contained 16.3% by weight of Y zeolite with a lattice parameter of 2.429 nm, a global $SiO_2/Al_2O_3$ ratio of 30.4 and a framework $SiO_2/Al_2O_3$ ratio of 58.

Catalyst CZ2P was then impregnated with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ2BP was obtained: NiMoP/alumina-Y doped with boron.

A catalyst CZ2PSi was prepared using the same procedure as for catalyst CZ2PB, replacing the boron precursor in the impregnation solution with Rhodorsil EP1 (Rhone-Poulenc) silicone emulsion.

Finally, catalyst CZ2PBSi was prepared by impregnating the catalyst with an aqueous solution comprising ammonium biborate and Rhodorsil EP1 (Rhone-Poulenc) silicone emulsion. The other steps of the procedure were the same as those indicated above. Fluorine was then added to this catalyst by impregnating with a dilute hydrofluoric acid solution so as to deposit about 1% by weight of fluorine. After drying overnight at 120° C. and calcining at 550° C. for 2 hours in dry air, catalyst CZ5PBSiF was obtained. The characteristics of catalysts CZ2 are summarised in Table 1.

TABLE 2

Characteristics of CZ2 catalysts containing manganese

| Catalyst | CZ2 PMn | CZ2 PMnBSi | CZ2 PMnBSiF |
|---|---|---|---|
| $MoO_3$ (wt %) | 12.7 | 12.4 | 12.2 |
| NiO (wt %) | 2.9 | 2.8 | 2.8 |
| $MnO_2$ (wt %) | 1.4 | 1.3 | 1.3 |
| $P_2O_5$ (wt %) | 4.4 | 4.2 | 4.2 |
| $B_2O_3$ (wt %) | 0 | 1.9 | 1.8 |
| $SiO_2$ (wt %) | 15.1 | 16.4 | 16.2 |
| F (wt %) | 0 | 0 | 0.95 |
| Complement to 100%, mainly composed of $Al_2O_3$ (wt %) | 63.5 | 61.0 | 60.55 |

Electronic microprobe analysis of catalysts CZ2Si, CZ2BSi, CZ2PSi, CZ2PBSi, CZ2PBSiF (Table 1) and catalysts CZ2PMnBSi, CZ2PMnBSiF (Table 2) showed that the silicon added to the catalyst of the invention was principally located on the matrix and was in the form of amorphous silica.

EXAMPLE 3

Preparation of a support containing dealuminated Y zeolite and a silica-alumina

We produced a silica-alumina powder by co-precipitating of a composition of 4% $SiO_2$, 96% $Al_2O_3$. A support for a hydrocracking catalyst containing this silica-alumina and a dealuminated Y zeolite was then produced. To this end,

TABLE 1

Characteristics of CZ2 catalysts

| Catalyst | CZ2 | CZ2 P | CZ2 B | CZ2 Si | CZ2 BSi | CZ2 PB | CZ2 PSi | CZ2 PBSi | CZ2 PBSiF |
|---|---|---|---|---|---|---|---|---|---|
| $MoO_3$ (wt %) | 13.5 | 12.9 | 13.2 | 13.2 | 12.9 | 12.7 | 12.7 | 12.5 | 12.3 |
| NiO (wt %) | 3.1 | 3.0 | 3.0 | 3.0 | 3.0 | 2.9 | 2.9 | 2.8 | 2.8 |
| $P_2O_5$ (wt %) | 0 | 4.4 | 0 | 0 | 0 | 4.3 | 4.3 | 4.2 | 4.2 |
| $B_2O_3$ (wt %) | 0 | 0 | 2.0 | 0 | 2.0 | 1.8 | 0 | 1.8 | 1.9 |
| $SiO_2$ (wt %) | 16.0 | 15.3 | 15.7 | 17.7 | 17.4 | 15.1 | 16.9 | 16.6 | 15.6 |
| Complement to 100%, mainly composed of $Al_2O_3$ (wt %) | 67.4 | 64.4 | 66.1 | 66.1 | 64.7 | 63.2 | 63.2 | 62.1 | 63.2 |

Catalyst CZ2P was then impregnated with an aqueous solution comprising manganese nitrate. After ageing at room temperature in an atmosphere saturated with water, the impregnated extrudates were dried overnight at 120° C. then calcined at 550° C. for 2 hours in dry air. Catalyst CZ2PMn was obtained. This catalyst was then impregnated with an aqueous solution comprising ammonium biborate and Rhodorsil EP1 (Rhone-Poulenc) silicone emulsion. The impregnated extrudates were then dried overnight at 120° C. and calcined at 50° C. for 2 hours in dry air to obtain catalyst CZ2PMnBSi. Fluorine was then added to this catalyst by impregnating with a dilute hydrofluoric acid solution so as to deposit about 1% by weight of fluorine. After drying overnight at 120° C. and calcining at 550° C. for 2 hours in dry air, catalyst CZ2PMnBSiF was obtained. The characteristics of these catalysts are summarised in Table 2.

20.8% by weight of the Y zeolite of Example 1 was used, which was mixed with 79.2% by weight of a matrix composed of the silica-alumina prepared as above. This powder mixture was then mixed with an aqueous solution containing 66% nitric acid (7% by weight of acid per gram of dry gel) then mixed for 15 minutes. After mixing, the paste obtained was passed through a die with cylindrical orifices with a diameter of 1.4 mm. The extrudates were dried overnight at 120° C. then calcined at 550° C. for 2 hours in moist air containing 7.5% by volume of water. Cylindrical extrudates 1.2 mm in diameter were obtained with a specific surface area of 255 $m^2$/g and a unimodal pore size distribution centred on 11 nm. An X ray diffraction analysis of the matrix revealed that it was composed of low crystallinity cubic gamma alumina and Y zeolite with a lattice parameter of 2.429 nm, a global $SiO_2/Al_2O_3$ ratio of 15.8 with a framework $SiO_2/Al_2O_3$ ratio of 59.

EXAMPLE 4

Preparation of catalysts containing a dealuminated Y zeolite and a silica-alumina Extrudates of the support containing a silica-alumina and a dealuminated Y zeolite of Example 3 were dry impregnated with an aqueous solution of a mixture of ammonium heptamolybdate and nickel nitrate, dried overnight at 120° C. in air and finally calcined at 550° C. in air. The oxide weight contents of catalyst CZ18 obtained are shown in Table 3. The final CZ18 catalyst contained 17.2% by weight of Y zeolite. X ray diffraction analysis of the matrix revealed that it was composed of low crystallinity cubic gamma alumina and Y zeolite with a lattice parameter of 2.428 nm, a global $SiO_2/Al_2O_3$ ratio of 15.6 and a framework $SiO_2/Al_2O_3$ ratio of 58.

Catalyst CZ 18 was then impregnated with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ18B was obtained Extrudates of the support containing the Y zeolite of Example 3 were also dry impregnated with an aqueous solution of a mixture of ammonium heptamolybdate, nickel nitrate and orthophosphoric acid, dried overnight at 120° C. in air and finally calcined at 550° C. in air. The oxide weight contents of catalyst CZ18P obtained are shown in Table 3. The final CZ18P catalyst contained 16.4% by weight of Y zeolite. X ray diffraction analysis of the matrix revealed that it was composed of low crystallinity cubic gamma alumina and Y zeolite with a lattice parameter of 2.428 nm, a global $SiO_2/Al_2O_3$ ratio of 15.7 and a framework $SiO_2/Al_2O_3$ ratio of 57.

Catalyst CZ18P was then impregnated with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ18BP was obtained.

The characteristics of catalysts CZ18 are summarised in Table 3.

TABLE 3

Characteristics of CZ18 catalysts

| Catalyst | CZ18 | CZ18 P | CZ18 B | CZ18 PB |
|---|---|---|---|---|
| $MoO_3$ (wt %) | 13.9 | 13.3 | 13.7 | 13.1 |
| NiO (wt %) | 3.2 | 3.1 | 3.15 | 3.0 |
| $P_2O_5$ (wt %) | 0 | 4.6 | 0 | 4.5 |
| $B_2O_3$ (wt %) | 0 | 0 | 1.95 | 1.8 |
| $SiO_2$ (wt %) | 18.7 | 17.9 | 18.5 | 17.6 |
| Complement to 100%, mainly composed of $Al_2O_3$ (wt %) | 64.2 | 61.1 | 62.7 | 60.0 |

EXAMPLE 5

Comparison of catalysts for partial conversion hydrocracking of a vacuum gas oil The catalysts prepared in the above examples were employed under moderate pressure hydrocracking conditions using a petroleum feed with the following principal characteristics:

| | |
|---|---|
| Density (20/4) | 0.921 |
| Sulphur (weight %) | 2.46 |
| Nitrogen (ppm by weight) | 1130 |
| Simulated distillation | |
| Initial point | 365° C. |
| 10% point | 430° C. |
| 50% point | 472° C. |
| 90% point | 504° C. |
| End point | 539° C. |
| Pour point | +39° C. |

The catalytic test unit comprised two fixed bed reactors in upflow mode. The 0 catalyst for the first hydrotreatment step of the process, HTH548 from Procatalyse, comprising a group VIB element and a group VIII element deposited on alumina, was introduced into the first reactor, through which the feed passed first. A hydrocracking catalyst as described above was introduced into the second reactor, through which the feed passed last. 40 ml of catalyst was introduced into each of the reactors. The two reactors operated at the same temperature and the same pressure. The operating conditions of the test unit were as follows:

| | |
|---|---|
| Total pressure | 5 MPa |
| Hydrotreatment catalyst | 40 cm³ |
| Hydrocracking catalyst | 40 cm³ |
| Temperature | 400° C. |
| Hydrogen flow rate | 20 l/h |
| Feed flow rate | 40 cm³/h |

The two catalysts underwent in-situ sulphurisation before the reaction. It should be noted that any in-situ or ex-situ sulphurisation method is suitable. Once sulphurisation had been carried out, the feed described above could be transformed.

The catalytic performances are expressed as the gross conversion at 400° C. (GC), the gross selectivity for middle distillates (GS) and the hydrodesulphuration (HDS) and hydrodenitrogenation (HDN) conversions. These catalytic performances were measured for the catalyst after a stabilisation period, generally of at least 48 hours, had passed.

The gross conversion GC is taken to be:

GC=weight % of 380° $C.^{minus}$ of effluent.

The gross selectivity GS for middle distillates is taken to be:

GS=100* weight of (150° C.–380° C.) fraction/weight of 380° $C.^{minus}$ fraction of effluent.

The hydrodesulphuration conversion HDS is taken to be:

HDS=$(S_{initial}-S_{effluent})/S_{initial}$* 100=$(24600-S_{effluent})$ 24600 * 100

The hydrodenitrogenation conversion HDN is taken to be:

HDN=$(N_{initial}-N_{effluent})/N_{initial}$* 100=$(1130-N_{effluent})$/ 1130 * 100

Table 4 below shows the gross conversion GC at 400° C., the gross selectivity GS.

TABLE 4

Catalytic activities of catalysts for partial hydrocracking at 400° C.

|  |  | GC (wt %) | GS (%) | HDS (%) | HDN (%) |
|---|---|---|---|---|---|
| CZ2 | NiMo/Y | 48.1 | 80.5 | 98.86 | 95.3 |
| CZ2P | NiMoP/Y | 48.7 | 80.3 | 99.43 | 96.6 |
| CZ2B | NiMoB/Y | 49.1 | 80.5 | 98.93 | 95.6 |
| CZ2Si | NiMoSi/Y | 49.4 | 80.6 | 99.33 | 96.2 |
| CZ2BSi | NiMoBSi/Y | 49.7 | 80.1 | 99.47 | 96.6 |
| CZ2PB | NiMoPB/Y | 49.3 | 80.4 | 99.57 | 97.4 |
| CZ2PSi | NiMoPSi/Y | 49.5 | 78.9 | 99.85 | 98.3 |
| CZ2PBSi | NiMoPBSi/Y | 50.8 | 78.1 | 99.92 | 98.8 |

The results of Table 4 show that adding Si and especially in the presence of P and/or B improved the performances of the catalyst for conversion. The gross selectivity for middle distillates reduced because of the increase in the degree of conversion, as is well known. The dealuminated Y zeolite catalysts of the invention are thus of particular importance for partial hydrocracking of vacuum distillate type feeds containing nitrogen at a moderate hydrogen pressure.

TABLE 5

Catalytic activities for catalysts CZ2 and CZ18 with equivalent compositions for partial hydrocracking at 400° C.

|  |  | GC (wt %) | GS (wt %) | HDS (%) | HDN (%) |
|---|---|---|---|---|---|
| CZ18 | NiMo/Y—SiAl | 48.3 | 79.9 | 98.2 | 95.1 |
| CZ2Si | NiMoSi/Y | 49.4 | 80.6 | 99.33 | 96.2 |
| CZ18P | NiMoP/Y—SiAl | 48.7 | 79.1 | 98.25 | 95.5 |
| CZ2PSi | NiMoPSi/Y | 49.5 | 78.9 | 99.85 | 98.3 |
| CZ18B | NiMoB/Y—SiAl | 49.2 | 79.8 | 98.3 | 96.1 |
| CZ2BSi | NiMoBSi/Y | 49.7 | 80.1 | 99.47 | 96.6 |
| CZ18PB | NiMoPB/Y—SiAl | 49.2 | 78.7 | 98.1 | 97.7 |
| CZ2PBSi | NiMoPBSi/Y | 50.8 | 78.1 | 99.92 | 98.8 |

The results of Table 5 show that it is advantageous to introduce silicon into the already prepared catalyst rather than in the form of a support containing silicon obtained from a silica-alumina. This is true whether or not the catalyst contains phosphorous. It is thus particularly advantageous to introduce silicon to a precursor already containing group VIB and/or VIII elements and optionally at least one of elements P and F.

Catalysts containing an alumina acidified by silicon and a globally non dealuminated zeolite are thus of particular importance for partial hydrocracking of a vacuum distillate type feed containing nitrogen at a moderate hydrogen pressure.

EXAMPLE 6

Comparison of catalysts for high conversion hydrocracking of a vacuum gas oil

The catalysts prepared as described above were used under high conversion (60–100%) hydrocracking conditions. The petroleum feed was a hydrotreated vacuum distillate with the following principal characteristics:

| Density (20/4) | 0.869 |
|---|---|
| Sulphur (ppm by weight) | 502 |
| Nitrogen (ppm by weight) | 10 |
| Simulated distillation | |
| Initial point | 298° C. |
| 10% point | 369° C. |
| 50% point | 427° C. |
| 90% point | 481° C. |
| End point | 538° C. |

This feed had been obtained by hydrotreatment of a vacuum distillate using a HR360 catalyst from Procatalyse comprising a group VI element and a group VIII element deposited on alumina.

0.6% by weight of aniline and 2% by weight of dimethyldisulphide were added to the feed to simulate the partial pressures of $H_2S$ and $NH_3$ present in the second hydrocracking step. The prepared feed was injected into the hydrocracking test unit 20 which comprised one fixed bed reactor in upflow mode, into which 80 ml of catalyst had been introduced. The catalyst was sulphurised using a n-hexane/DMDS+ aniline mixture at 320° C. It should be noted that any in-situ or ex-situ sulphurisation method is suitable.

Once sulphurisation had been carried out, the feed described above could be transformed. The operating conditions of the test unit were as follows:

| Total pressure | 9 MPa |
|---|---|
| Catalyst | 80 cm$^3$ |
| Temperature | 360–420° C. |
| Hydrogen flow rate | 80 l/h |
| Feed flow rate | 80 cm$^3$/h |

The catalytic performances are expressed as the temperature at which a gross conversion of 70% is produced and by the gross selectivity for 150–380° C. middle distillates. These catalytic performances were measured for the catalyst after a stabilisation period, generally of at least 48 hours, had passed.

The gross conversion GC is taken to be:

GC=weight % of 380° C.$^{minus}$ of effluent.

The gross selectivity GS for middle distillates is taken to be:

GS=100* weight of (150° C.–380° C.) fraction/weight of 380° C.$^{minus}$ fraction of effluent.

The reaction temperature was fixed so as to obtain a gross conversion GC of 70% by weight. Table 6 below shows the reaction temperature and gross selectivity for the catalysts described in Tables 1 and 2.

TABLE 6

Catalytic activities of catalysts for high conversion hydrocracking (70%)

|  |  | T (° C.) | GS (%) |
|---|---|---|---|
| CZ2 | NiMo/Y | 375 | 65.8 |
| CZ2P | NiMoP/Y | 375 | 65.9 |
| CZ2PB | NiMoPB/Y | 374 | 66.2 |
| CZ2PSi | NiMoPSi/Y | 374 | 66.4 |
| CZ2PBSi | NiMoPBSi/Y | 372 | 66.8 |
| CZ2PBSiF | NiMoPBSiF/Y | 370 | 67.5 |

TABLE 6-continued

Catalytic activities of catalysts for high conversion hydrocracking (70%)

|  |  | T (° C.) | GS (%) |
|---|---|---|---|
| CZ2PMn | NiMoPMn/Y | 374 | 66.2 |
| CZ2PMnBSi | NiMoPMnBSi/Y | 370 | 67.3 |
| CZ2PMnBSiF | NiMoPMnBSiF/Y | 369 | 67.2 |

Adding silicon to the catalyst containing a Y zeolite improved the conversion activity, meaning a reduction in the reaction temperature necessary to attain 70% of conversion, and the gross selectivity for middle distillates was better. The catalysts of the invention containing silicon are thus of particular importance for high conversion hydrocracking of a vacuum distillate type feed at a moderate pressure. Further, if manganese and/or fluorine is added, an improvement in the converting activity is also observed, with a slight improvement in the gross selectivity for middle distillates.

What is claimed is:

1. A catalyst comprising a matrix, a hydro-dehydrogenating metal, at least one Y zeolite which is dealuminated and has a lattice parameter in the range 2.424 nm to 2.455 nm, a global $SiO_2/Al_2O_3$ mole ratio of more than 8, an atomic ratio of the sum of alkaline-earth metal cations, alkali metal cations and rare earth metal cations to Al corresponding to the ratio $(n \times M^{n+})/Al$, wherein n is the charge of cation M, bless than 0.8, a specific surface area, determined using the BET method, of more than 400 m²/g, and a water adsorption capacity of more than 6% by weight for $P/P_0 = 0.2$ at 25° C., said catalyst also comprising silicon deposited principally on the matrix.

2. A catalyst according to claim 1, also comprising at least one element selected from the group consisting of phosphorous and boron.

3. A catalyst according to claim 2, also comprising at least one halogen.

4. A catalyst according to claim 3, in which the halogen is fluorine.

5. A catalyst according to claim 3, also comprising at least one group VIIIB element.

6. A catalyst according to claim 5, in which the group VIIB element is manganese.

7. A catalyst according to claim 6, further comprising a hydro-dehydrogenating metal selected from the group consisting of group VI and group VIII metals.

8. A catalyst according to claim 2, wherein the catalyst comprises boron principally deposited on the matrix.

9. A catalyst according to claim 1, also comprising at least one halogen.

10. A catalyst according to claim 9, in which the halo-en is fluorine.

11. A catalyst according claim 1, also comprising at least one group VIIB element.

12. A catalyst according to claim 11, in which the group VIB element is manganese.

13. A catalyst according to claim 1 wherein a hydro-dehydrogenating metal is selected from the group consisting of group VI and group VIII metals.

14. A catalyst according to claim 1, further containing boron deposited principally on the matrix.

15. A catalyst according to claim 1, wherein the matrix comprises alumina, silica-alumina, silica or an aluminate.

16. A catalyst according to claim 15, wherein the matrix comprises gamma alumina.

17. A catalyst according to claim 16, wherein the catalyst comprises nickel, molybdenum, and at least one member selected from the group consisting of manganese and fluorine.

18. A catalyst according to claim 17, wherein the catalyst comprises nickel, molybdenum, and at least one member selected from the group consisting of boron and phosphorous.

19. A catalyst according to claim 18, wherein the catalyst comprises boron principally deposited on the matrix.

20. A process for preparing a catalyst to claim 1:
  a) preparing a precursor, comprising a mixture of said at least one matrix, mid at least one Y zeolite, said at least one hydro-dehydrogenating element, and optionally phosphorous;
  b) impregnating the precursor with a solution containing silicon, optionally at least one member selected from the group consisting of phosphorous and boron, and optionally at least one halogen so as to deposit the silicon principally on the matrix; and
  c) drying and calcining the solid obtained from step h).

21. A catalyst produced according to the process of claim 20.

22. In a catalytic process for converting a hydrocarbon-containing feed the improvement comprising contacting said feed with a catalyst according to claim 1, at over about 200° C. under catalytic hydrocarbon conversion conditions.

23. A process according to claim 22, for partial hydrocracking wherein the catalytic hydrocracking conditions result in a degree of conversion of less than 55%.

24. A process according to claim 22, wherein the hydrocarbon-containing feed has been hydrotreated in a preceding step, and the resultant hydrotreated feed is subjected to hydrocracking under catalytic conditions to result in a degree of conversion of over 55%.

* * * * *

UNITED STATES PATENT AND TRADEMARK OFFICE
CERTIFICATE OF CORRECTION

PATENT NO. : 6,171,474 B1
DATED : January 9, 2001
INVENTOR(S) : Kasztelan et al.

It is certified that error appears in the above-identified patent and that said Letters Patent is hereby corrected as shown below:

Column 15,
Line 30, reads "cation M, bless than 0.8" should read -- cation M, less than 0.8 --

Column 16,
Line 6, reads "VIB element" should read -- VIIB element --
Line 28, reads "matrix, mid at least one" should read -- matrix, said at least one --
Line 36, reads "obtained from step h)." should read -- obtained from step b) --

Signed and Sealed this

Eighth Day of January, 2002

Attest:

JAMES E. ROGAN
Attesting Officer
Director of the United States Patent and Trademark Office